United States Patent [19]

Baba

[11] Patent Number: 4,513,893
[45] Date of Patent: * Apr. 30, 1985

[54] APPARATUS FOR SPREADING A POLYURETHANE FOAMABLE COMPOSITON

[75] Inventor: Morimitsu Baba, Fukuoka, Japan

[73] Assignees: Asahi Glass Company Ltd., Tokyo; Baba Seisakusho Co., Ltd., Yame, both of Japan

[*] Notice: The portion of the term of this patent subsequent to Jun. 1, 1999 has been disclaimed.

[21] Appl. No.: 358,852

[22] Filed: Mar. 10, 1982

Related U.S. Application Data

[63] Continuation of Ser. No. 185,911, filed as PCT JP 79/00054, Mar. 7, 1979 published as WO 79/00734 Oct. 4, 1979, § 102 (e) date Sep. 26, 1979, Pat. No. 4,332,281.

[30] Foreign Application Priority Data

Mar. 10, 1978 [JP] Japan ................................. 53-26633
Sep. 9, 1978 [JP] Japan ............................... 53-110223

[51] Int. Cl.³ ............................................... B05B 3/02
[52] U.S. Cl. .................................................. 222/281
[58] Field of Search ............... 118/DIG. 16, 323, 300; 141/1, 129, 131, 324, 392; 222/403, 423, 414, DIG. 1, 272, 281; 239/220; 264/51, 53, 54, 45.8, 46.2, 46.3; 425/817 C; 427/424, 427; 366/183

[56] References Cited

U.S. PATENT DOCUMENTS

| | | | |
|---|---|---|---|
| 1,588,062 | 6/1926 | Spivey | 239/220 X |
| 2,209,366 | 7/1940 | Vane | 427/424 |
| 3,193,406 | 7/1965 | Mittlemans | 264/45.8 |
| 3,681,485 | 8/1972 | Lieberman | 264/46.3 |
| 3,927,162 | 12/1975 | Stalter, Sr. | 264/51 |
| 3,932,980 | 1/1976 | Mizutani et al. | 366/183 X |

Primary Examiner—Stephen Marcus
Assistant Examiner—Mark Thronson
Attorney, Agent, or Firm—Oblon, Fisher, Spivak, McClelland & Maier

[57] ABSTRACT

A method and apparatus for spreading a foamable composition for forming a polyurethane foam. The foamable composition is uniformly spread on all of a surface which is moved by scattering the foamable composition uniformily in its transversal direction. The foamable composition is fed to spread on a first surface and then, the foamable composition is scattered from the first surface as fine particles to the second surface. For example, the foamable composition (10) is fed to spread on a pair of rotated spreading rolls and then, the foamable composition is scattered as fine particles by a pair of rotated scattering rolls (3), (4) which are respectively contacted with the spreading rolls. This can be used for preparing a polyurethane foam sheet or a laminated product having a polyurethane foam layer.

3 Claims, 3 Drawing Figures

APPARATUS FOR SPREADING A POLYURETHANE FOAMABLE COMPOSITON This is a continuation of application Ser. No. 185,911, filed as PCT JP 79/00054, Mar. 7, 1979 published as WO 79/00734 Oct. 4, 1979, § 102(e) date Sept. 26, 1979 now U.S. Pat. No. 4,332,281.

FIELD OF TECHNOLOGY

The present invention relates to a method and apparatus for spreading a foamable composition for forming a polyurethane foam.

The present invention especially relates to a method and apparatus for spreading a foamable composition on a surface which relatively moves to a spreader to form a uniform polyurethane foam layer.

BACKGROUND OF TECHNOLOGY

A polyurethane foam is prepared by foaming and setting a foamable composition comprising main components of an active hydrogen compound having at least two active hydrogen atoms and an isocyanate compound having at least two isocyanate groups. The foamable composition can comprise a blowing agent, a catalyst, a foam regulator etc. together with the two main components. Sometimes, it further comprises additional components such as flameproofing agent, a coloring agent, a stabilizer, a filler etc.

The foamable composition usually begins to cause foaming within at least several tens seconds after the blending and completes the foaming within several to ten and several minutes after the blending. Tackiness of the surface is lost to complete the setting at certain time after completing the foaming.

In the technical field, a period from the completion of the blending to the time just before blowing a white creamy liquid of the foamable composition in the initiation of foaming is called as a cream time, and a period for blowing the creamy liquid to grow a foam and to complete the blowing is called as rise time and a period for setting the surface of the foam after the rise is called as set time.

It is relatively difficult to form a uniform thin foamable composition layer by spreading a foamable composition obtained by mixing components from a feeding outlet to a surface which is relatively moved to the feeding outlet.

These surfaces for relatively moving include slab belt surface, a mold inner wall and a plate surface. The feeding outlet of a mixer is usually in a form of holes. Therefore, even though a foamable composition is fed on a surface which is relatively moved to the feeding outlet, the foamable composition is placed in the form of strips on the surface. In the conventional slab formation of a soft polyurethane foam, such process has been employed. Since the foamable composition has low viscosity, the foamable composition is spread on the surface of the slab belt by its dead weight and the three-dimentional blowing is resulted and the foamable composition is expanded to required width since the blowing rate is large. When the width of the slab belt is large, the feeding outlet is reciprocated in the transversal direction of the slab belt so as to place the foamable composition in zig-zag on the surface of the slab belt. It is difficult to employ said method when a foamable composition for a hard polyurethane foam has high viscosity or a foamable composition should be placed in thin thickness for forming a thin polyurethane foam or a blowing rate of a foamable composition is low.

A method for distributing a foamable compositon on a whole surface which is relatively moved to a linear feeding outlet for the foamable composition which is arranged to a perpendicular direction to the moving direction of the relative movement has been known. For example, in the specification of U.S. Pat. No. 3,927,162, a method for feeding a foamable composition on a whole inner surface of a moving mold from a sector feeding outlet is described. However, in this method, in order to discharge uniformly a foamable composition from all part of the linear feeding outlet, a pressure being higher than certain degree is required. When the pressure is lower than this degree, a discharge from the top of the feeding outlet is difficult. When a width of the feeding outlet is narrower without varying its length to reduce a feeding rate of the foamable composition, the clogging of the foamable composition is easily caused to be difficult feeding uniformly. A foamable composition is foamed and set for a short time, whereby the clogging of the feeding outlet is caused by the foamable composition set near the linear feeding outlet and the uniform feeding of the foamable composition from all position of the linear feeding outlet is difficult. This phenomenon is especially caused when the width of the feeding outlet is narrow and the feeding rate of the foamable composition is low.

A method for spraying a foamable composition by a spray has been known. However, a nozzle of the spray has holes of the feeding outlet. Even though particles of the foamable composition is sprayed in spread, the sprayed composition is placed in a circular form. Therefore, even though the surface is relatively moved, the foamable composition is placed in a broad linear form. Even though the spray nozzle is reciprocated in the transversal direction on the surface which is relatively moved to overlap edges of the broad linear form of the foamable composition on the surface, it is difficult to give uniform quantity of the foamable composition at the overlap-sprayed place and non-overlap-sprayed place. Moreover, in order to spray a foamable composition, a compressing means such as use of compressed air is required and a spraying of a foamable composition having high viscosity is difficult and a vaporization of toxic isocyanate compound having low boiling point is easily caused.

On the other hand, it has not been easy to form a thin foamable composition layer on a surface, which results a formation of a thin polyurethane foam layer. Heretofore, a method for bonding sheets obtained by slicing a block of a polyurethane foam which is foamed and set, has been widely employed. However, the slicing and bonding of sliced sheets of polyurethane foam are complicated. A method for spread-coating a foamable composition after placing it on a surface has not been easy since the foaming and setting of the foamable composition are speedy. When the position of the moving surface is varied, for example, the surface is a waved surface, it has been difficult to uniformly spread-coat the foamable composition in thin thickness. A method for preparing a thin broad sheet by foaming and setting a foamable composition in a sealed mold has been difficult. For example, when a required quantity of a foamable composition is put in a mold to close the mold and the foamable composition is intended to expand by the blowing pressure of the foamable composition to all corners of the mold in the foaming and setting. The blowing pressure is usually not enough to fill the foamed composition in all of the space.

It is expected to dissolve these difficulties by uniformly spreading the foamable composition in thin thickness, on all of the surface.

SUMMARY OF THE INVENTION

It is an object of the present invention to provide a method and apparatus for spreading a foamable composition for polyurethane foam on a surface which is relatively moved. It is especially an object of the present invention to provide a method and apparatus for spreading a foamable composition uniformly in the transversal direction to the relative movement.

It is another object of the present invention to provide a method and apparatus for uniformly spreading a required quantity of a foamable composition regardless of viscosity of the foamable composition.

It is the other object of the present invention to provide a method for spreading a foamable composition in thin thickness on a surface which is relatively moved.

It is the further object of the present invention to provide a method and apparatus for spreading uniformly a foamable composition in thin thickness regardless of surface position even though a surface which is relatively moved, is a surface whose position is varied such as a waved surface. It is especially the object of the present invention to provide a method and apparatus for spreading to form a foamable composition layer having uniform thickness on a top, a bottom and a slant surface of a waved surface.

These objects of the present invention have been attained by feeding a foamable composition for a polyurethane foam on a first surface to spread on it; and then, scattering the foamable composition which is further foamable as fine particles from said first surface to the object second surface which is relatively moved.

The first surface is preferably a surface of a rotary roll. The step for scattering the foamable composition as fine particles from the first surface to the second surface, is preferably a process for scattering it under centrifugal force by a rotary roll having fiber layer on its surface. The rotary roll for the first surface is called as a spreading roll and the rotary roll having fiber layer is called as a scattering roll. The present invention will be illustrated referring to the drawings. The present invention is not limited to the spreading method and spreading apparatus which comprises a combination of the spreading roll and the scattering roll. This problem is described below.

DESCRIPTION OF THE PREFERRED EMBODIMENTS OF THE INVENTION

Figure 1:
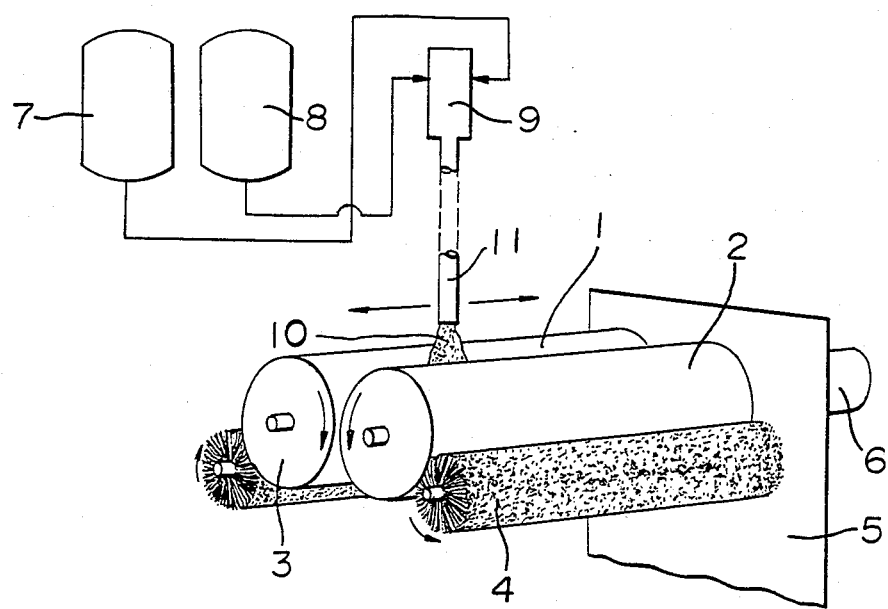
FIG. 1 is a schematic view of a first embodiment of the present invention.
Figure 2:
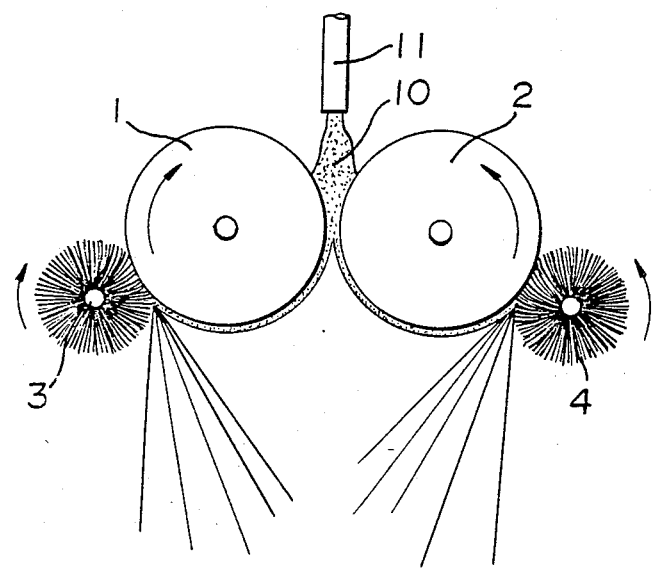
FIG. 2 is a partial side view of the first embodiment.

FIG. 1 is a schematic view of the first embodiment of the present invention. FIG. 2 is a partial side view of said embodiment.

The spreading apparatus comprises two spreading rolls (1), (2) and two scattering rolls (3), (4) which are fitted on side frames (5). A frame in a front side is not shown so as to show the side surfaces of the rolls. The rolls are driven by a driving device (6) such as one or more electric motors. The two spreading rolls (1), (2) are rotated in opposite direction each other as shown in the drawings. The faced surfaces of the two spreading rolls (1), (2) are rotated so as to move downwardly. The two scattering rolls (3), (4) are rotated to the direction corresponding to the spreading rolls (1), (2).

The foamable composition is prepared by mixing an aromatic diisocyanate such as TDI and MDI with a polyether-polyol containing a catalyst, a blowing agent and a foam regulating agent.

The aromatic diisocyanate is fed from a tank (7) and the polyether-polyol is fed from a tank (8) to a blending extruder (9) wherein the components are mixed. The resulting foamable composition (10) is fed through the nozzle (11) of the feeding outlet connected to the blending extruder (9), on the surfaces of the two spreading rolls (1), (2).

In order to feed uniformly the foamable composition on the spreading rolls (1), (2) in its longitudinal direction, it is preferable to reciprocally move the nozzle (11) above the spreading rolls (1), (2) as shown in the drawings in their longitudinal direction. The foamable composition (10) discharged from the nozzle (11) is spread on the spreading rolls (1), (2) through a gap between the pair of the spreading rolls (1), (2). The foamable composition is uniformly fed on the spreading rolls (1), (2) as the periodical consideration. The foamable composition passed through the gap between the spreading rolls (1), (2) is scattered in a form of fine particles from the bottoms by the scattering rolls (3), (4). The scattering rolls (3), (4) are brush rolls having many fine metallic filaments in radial direction.

The scattering rolls (3), (4) are rotated under contacting with the spreading rolls (1), (2) at high speed. Therefore, the foamable composition (10) on the spreading rolls (1), (2) is peeled off from the surfaces of the spreading rolls by the scattering rolls (3), (4) and is scattered as fine particles by centrifugal force by the scattering rolls (3), (4).

The fine particles of the foamable composition scattered are downwardly fallen at a speed given by the centrifugal force and the dead weight. However, the fine particles may float in air by the air resistance. Therefore, the part of the scattered fine particles are linearly fallen. However, some of the particles float as mist in air to fall at relatively low velocity. The foamable composition is uniformly distributed in the longitudinal direction of the spreading rolls (1), (2) by the presence of the fine particles of the scattered foamable composition fallen at relatively low speed together with the reciprocal movement of the nozzle (11).

Below the spreading apparatus, there is a second surface on which the scattered particles are deposited under moving reciprocally in the perpendicular direction to the longitudinal direction of the spreading rolls (1), (2) i.e. the right and left direction in FIG. 2. The foamable composition is uniformly scattered in the transversal direction on the second surface whereby an uniform foamable composition layer is formed on the second surface which is moved below the spreading apparatus under scattering the foamable composition.

Figure 3:
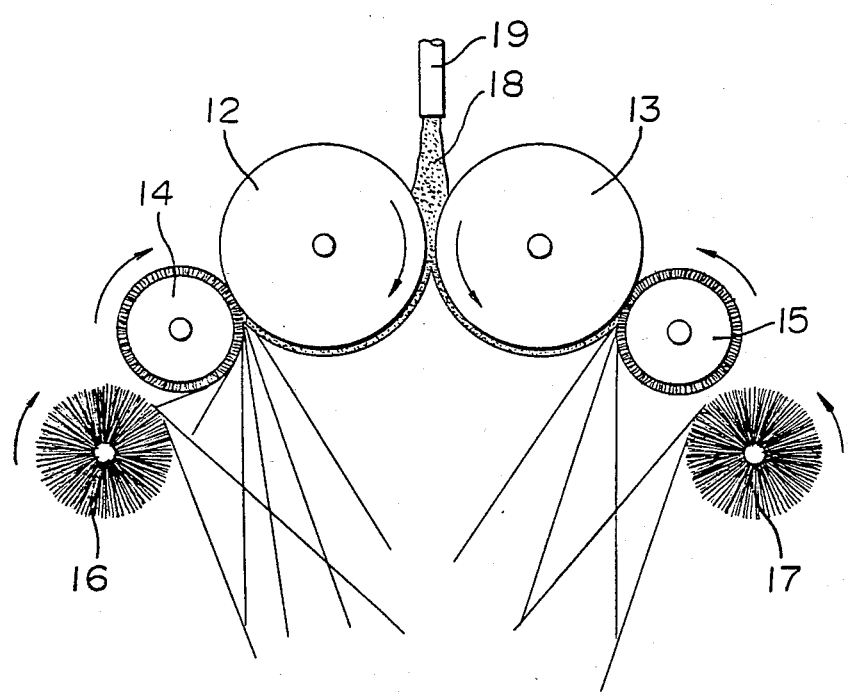
FIG. 3 is a side view of a second embodiment of the present invention which is further improved.

FIG. 3 is a side view of an improved apparatus which is suitable for scattering the foamable composition having relatively high viscosity such as the foamable composition which forms a hard polyurethane foam.

The first improved feature is to employ scattering rolls having a fibrous layer which is relatively thin thickness and dense.

The second improved feature is to employ auxiliary scattering rolls which are rotated without contacting with the scattering rolls below the scattering rolls. The second improved feature is not always necessary and sometimes, it is not employed.

The spreading apparatus is similar to the apparatus of FIG. 2 and comprises two spreading rolls (12), (13) which are located in parallel with a gap; two scattering rolls (14), (15) which rotated under contacting respectively with the lower outer sides of the rolls; and two auxiliary scattering rolls (16), (17) which are rotated without contacting them below the scattering rolls.

The rotary directions of the rolls are shown in the drawings.

As shown in FIG. 3, the foamable composition (18) is fed through a nozzle (19) on the spreading rolls (12), (13) and then, it is scattered by the scattering rolls (14), (15). A part of the scattered foamable composition is scattered again by the auxiliary scattering rolls (16), (17).

As the scattering rolls (3), (4) in FIGS. 1 and 2, brush rolls having many filaments of a metallic fiber, a synthetic fiber or a natural fiber in radial direction are used. The brush rolls effectively scatter the foamable composition by their centrifugal force and their repulsive force caused by being bent under contacting with the spreading rolls. However, when the foamable composition having high viscosity is scattered, an adhesive property of the foamable composition to the filaments is high and the filament distribution is relatively rough, there is great possivility that the foamable composition is put into gaps of the filaments. The foamable composition put into the gaps of the filaments of the brush rolls is foamed and set in the gaps whereby the brush rolls are solidified in a cylindrical form and the effective scattering is difficult.

When the scattering rolls (14), (15) shown in FIG. 3 are used, this trouble can be prevented. The latter scattering rolls have relatively thin fibrous layer in relatively dense on the surfaces thereof. The fibrous layer has fibers orientated in the radial direction as well as fibers arranged in other directions. For example, the fibrous layer can be a relatively rough fabric, a net or a woven fabric which is wound on the roll or a rough string or rope which is wound in a spiral form on the roll. A quality of the fiber is preferably one which is difficult to adhere the foamable composition. In particulary, it is suitable to be thick synthetic fiber and natural fiber. For example, the natural fibers include jute, manila hemp, sisal, hemp and hemp-palm.

The scattering roll shown in FIG. 3 has relatively high density whereby the foamable composition is difficult to put into the gaps. Moreover, the fibrous layer is thin whereby the foamable composition put into the gaps under the pressure caused by contacting it with the spreading roll, is easily squeezed out. However, the scattering rolls have relatively inferior effect for scattering the foamable composition in comparison with that of the brush rolls. Therefore, it is necessary to rotate them at higher speed. The foamable composition having high viscosity is easily adhered on the surface of the scattering rolls and is not easily detached from the surface whereby the particles of the foamable composition scattered out of the spreading apparatus are relatively increased and size of the particles is relatively larger. In order to overcome the disadvantage, it is suitable to use auxiliary scattering rolls (16), (17) shown in FIG. 3. The particles of the foamable composition adhered on the auxiliary scattering rolls, are finely divided by centrifugal force and scattered under controlling the scattering direction. A brush roll shown in FIGS. 1 and 2 is suitable as the auxiliary scattering rolls.

In the apparatus of the present invention shown in FIGS. 1, 2 and 3, rotary speeds of the spreading rolls, the scattering rolls and the auxiliary scattering rolls, reciprocal speed of the nozzle, and size of the apparatus are not critical and can be selected depending upon quantity of the scattered foamable composition, and area and relative speed of the second surface on which it is spread. For example, when the foamable composition is spread on the moving second surface having a width of from about 50 cm to 2 m, to form a polyurethane foam having a thickness of from about 0.5 cm to 20 cm, the following condition is preferably selected. The length of each roll is substantially same as the width of the second surface. The diameter of the roll is preferably from about 5 cm to about 50 cm. The gap between the pair of the spreading rolls is preferably less than 20 mm especially less than 10 mm. The thickness of the fibrous layer of the scattering rolls shown in FIG. 3 is preferably less than 3 cm especially less than 1.5 cm. The rotary speed of the spreading roll is preferably greater than 200 r.p.m. especially greater than 500 r.p.m. The rotary speed of the scattering rolls is preferably greater than 500 r.p.m. especially greater than 1,000 r.p.m., usually about several thousands r.p.m. The reciprocal movement of the nozzle is preferably greater than 10 times per minutes especially greater than 30 times per minutes.

The thickness of the foamable composition scattered on the second surface is depending upon the speed of the second surface and it becomes thinner depending upon faster speed of the second surface.

The spreading method of the present invention can be attained by employing an apparatus other than the apparatuses shown in FIG. 1, 2 and 3. For example, the foamable composition can be distributed by using one spreading roll and spreading it on the spreading roll by a doctor-knife and scattering the spread foamable composition by one scattering roll. A surface of a belt such as endless belt can be used as the first surface instead of the surface of the roll. Two belts can be combined. One belt and one roll can be also combined. The first surface should be a movable surface on which a foamable composition can be spread in a constant thickness. The means for scattering the foamable composition on the first surface as fine particles of the foamable composition is preferably a roll having a fibrous layer on its surface, but it is not critical. For example, a nozzle having a linear gas outlet opening can be used. The foamable composition on the first surface can be scattered as fine particles by a high speed gas such as air discharged from the nozzle.

The time scattering the foamable composition can be the time being further foamable, i.e. the cream time or the initial rise time. The control of the scattering time is attained by controlling the period from the formation of the foamable composition to the discharge from the nozzle or controlling the period from the feeding on the first surface to the scattering. The foamable composition discharged through the nozzle can be froth or nonfroth.

The object surface to be deposited i.e. the second surface is not critical. It can be a continuous surface as a surface of a slab belt or arranged plates having uniform size as a slate waved sheet. The second surface can be a flat surface or a non-flat surface. The material can be a rigid surface such as a metal a slate and wooden plate, and also a soft surface such as plastic film and cloth.

The features of the spreading method and the spreading apparatus of the present invention is to spread uniformly the foamable composition in the transversal direction of the second surface and to spread the foamable composition as fine particles. The spreading as fine particles is to form a uniform thin spread layer and to spread it in a uniform thickness even though the object surface is not flat. For example, a slate waved plate having a waved surface in the forward direction or a waved surface in the transversal direction is used as the second surface, the foamable composition is deposited in a uniform thickness at the tops or the bottoms and also at the slant surfaces. The foamable composition is deposited as fine particles. The fine particles are foated in a form of mist in air. The falling velocity of the fine particles is relatively slow and the direction of the deposition is not limited to the perpendicular direction. The fine particles can be deposited on the slant surface not only from the perpendicular direction but also other directions. The deposited amount on the slant surface is not remarkably lower than that of the horizontal surface. Accordingly, a polyurethane foam layer having a constant thickness can be formed on the waved slate plate. The polyurethane foam layer having a constant thickness can be formed by freely foaming the deposited foamable composition. It is also possible to result foaming and setting the deposited foamable composition under compressing it by a cover or a mold.

INDUSTRIAL UTILITY

The method and the apparatus of the present invention are utilized for the purpose of a formation of a polyurethane foam by spreading the foamable composition for a polyurethane foam on the second surface and foaming and setting it on the second surface. The second surface can be a surface of a slab belt or an inner surface of a mold. In the former case, a continuous polyurethane foam slab is obtained. In the latter case, a polyurethane foam molded product is obtained. When a surface of a rigid plate such as a slate waved sheet is used as the second surface and the spread foamable composition is freely foamed and set, a laminate having a polyurethane foam layer on one surface is obtained. When a second sheet is overlapped on the spread foamable composition on the second surface and the foamable composition is foamed and set, a sandwich plate having a middle layer of a polyurethane foam is obtained.

What is claimed is:

1. An apparatus for spreading a foamable composition for a polyurethane foam which comprises:
    a pair of spreading rolls which are arranged in parallel with a gap having faced surfaces rotated downwardly;
    a feed outlet for feeding said foamable composition for a polyurethane foam on the surfaces of said spreading rolls, at an upper position above said spreading rolls;
    a pair of rotated scattering rolls having fibrous surface layers which are located below said spreading rolls with said fibrous layers being in contact respectively with said surfaces of said spreading rolls;
    and said feed outlet for feeding said foamable composition being reciprocally movable in the longitudinal direction of said spreading rolls above said spreading rolls.

2. A spreading apparatus according to claim 1 wherein each of said scattering rolls having fibrous surface layers is a brush roll having many filaments which are arranged in the radial direction.

3. A spreading apparatus according to claim 1 wherein each of said scattering rolls having fibrous surface layers is a roll having a relatively thin fibrous layer on which many fibers are arranged in various directions.

* * * * *